United States Patent [19]

Miller

[11] Patent Number: 5,208,737

[45] Date of Patent: May 4, 1993

[54] CROSS CONNECT CABINET FOR TELECOMMUNICATIONS EQUIPMENT

[75] Inventor: Donald F. Miller, Austin, Tex.

[73] Assignee: Minnesota Mining and Manufacturing Company, St. Paul, Minn.

[21] Appl. No.: 744,990

[22] Filed: Aug. 14, 1991

[51] Int. Cl.$^5$ .............................. H01R 9/00
[52] U.S. Cl. ...................... 361/426; 174/59; 174/60; 312/223.6; 361/428; 361/429; 379/327; 439/709
[58] Field of Search ............. 174/59, 60; 312/223; 361/355, 390, 426, 428, 429; 379/326, 327, 331, 333, 329; 439/709, 719

[56] References Cited

U.S. PATENT DOCUMENTS

| | | | |
|---|---|---|---|
| 2,191,637 | 2/1940 | Wier | 379/327 |
| 3,375,406 | 3/1968 | Alden | 361/428 |
| 3,689,128 | 9/1972 | Andreini et al. | 361/429 |
| 4,062,611 | 12/1977 | Carlsson et al. | 361/428 |
| 4,641,754 | 2/1987 | Hebel et al. | 361/428 |
| 4,860,168 | 8/1989 | Wiljanen et al. | 361/428 |
| 4,901,202 | 2/1990 | Leachinger | 361/390 |
| 5,001,602 | 3/1991 | Suffi et al. | 361/390 |

FOREIGN PATENT DOCUMENTS 2828313 1/1980 Fed. Rep. of Germany ...... 379/327
56-51189 5/1981 Japan .................. 361/428

OTHER PUBLICATIONS

Bell Laboratories Record by Nicholas Osifchin "Connective Systems: Evolving New Strategies", Feb. 1972.
4200 Series Cabinets, 3M TelComm Products Division, 1983. Other Refs. Instructions, 4200E, 4200EE, 4200F and 4200G Cabinets, Issue 2, 3M TelComm Products Division, Sep. 1990.
4300 Series Cabinets for Modular Hardwire or Shelf Strip Cross Connect Systems, Instruction Bulletin Issue 4, 3M TelComm Products, Division, Feb. 1988.
4900 Series Cabinets, 3M Telecom Systems Group, 1991.
The Reliance Comm/Tec Telecommunications Network 1986–1987.

*Primary Examiner*—Leo P. Picard
*Assistant Examiner*—D. Sparks
*Attorney, Agent, or Firm*—Gary L. Griswold; Walter N. Kirn; John C. Barnes

[57] ABSTRACT

A cross-connect cabinet having columns of cross-connect blocks disposed in back-to-back relationship and a connection chamber for connecting the wires of such cross-connect blocks to the wires of an incoming or outgoing cable positioned above the cross connect cables, and being adapted to be sealed and filled with an encapsulant.

10 Claims, 4 Drawing Sheets

CROSS CONNECT CABINET FOR TELECOMMUNICATIONS EQUIPMENT

BACKGROUND OF THE INVENTION

This invention relates to a cross-connect cabinet for use in joining the wire pairs from a central office to wire pairs of subscribers and in one aspect, to an improved cabinet which will conserve space, improve efficiency and control access.

DESCRIPTION OF THE PRIOR ART

Cross-connect cabinets are well known in the art and are used to bring a transmission line to a location from which the cable is divided and wire pairs are connected to lines of subscribers. There are various styles and types of such cabinets as illustrated in U.S. Pat. No. 4,901,202 wherein the cables enter into the cabinet from two legs 14a and 14b of a base 14 on which is mounted a housing 20.

The housing includes interior partitions for cross connect terminals of the type well known in the art. These terminals allow for a cross connection between the central office cable pairs and the subscriber cable pairs. The connection of the cable pairs to the cross-connect terminals mounted in the cabinet is obtained through the doors and the connections to the cables are made to the rear of the cross-connect terminals and then connections between terminals are made from the open side upon opening of the doors. The cross-connect terminals are usually supported on frames which are hinged as illustrated, for example, in U.S. Pat. No. 5,001,602 and as is well known in commercially available in double backed cabinets such as included in the 4200 Series cabinets available from Minnesota Mining and Manufacturing Company, of St. Paul, Minn.

The making of these connections behind the panels of cross-connect blocks requires considerable space and access to the area behind the blocks is obtained by movement of the blocks or by removal of a panel in the back of the cabinet. Cabinets have been designed such that the cross-connect blocks are permanently located and accessible through doors, but the rear or interior of the cabinet is devoted to the connection between the cables and the cross-connect blocks and access is accomplished through a removable panel in the rear of the cabinet such as in the 4900 Series cabinets of Minnesota Mining and Manufacturing Company, the assignee of this application. With the access to the cross-connect blocks being only at the rear, even when the cabinet is arcuate in shape, space for the cables and connection modules is required. Alternatively, the frames supporting the cross-connect blocks pivot about the top, bottom or a side to swing to an out of the way position to permit access to the back of the frames supporting the blocks to allow connection between the cross-connect blocks and the cable pairs.

The present invention attempts to reduce the amount of space upon which the cabinet will be positioned and to afford easier access to make connections between the cables from the central office and the cross-connect blocks and between other cross-connect blocks and the cable pairs of the subscriber cables.

Further, the present invention affords a design which permits the encapsulation of the wires and connectors connecting the cable pairs and the cross-connect wires such that these wires are protected from exposure to the environment, i.e. the heat and ambient air, which over long periods of time can have a deleterious effect on the insulation. Further, the connection or disconnection by craftspeople who do not have the requisite skill to make changes in such connections between the central office cable pairs and the subscriber cable pairs with the cross-connect blocks is restricted.

Because the telephone operating companies have craftspersons with different levels of skill and responsibilities, it is desired that only those persons with the requisite skill level have access to the connections between the cable pairs and the cross-connect blocks where other persons have access to the cross-connect blocks to make changes in subscriber connections.

Thus, the present invention disposes all of the connections between the central office cable pairs and the cross-connect blocks and between the cross-connect blocks and the subscriber cable pairs in a connection chamber area. The cover for the chamber can be closed and locked, and in one embodiment, the wires can be sealed by an encapsulant, to protect the wires and limit access to the connections.

The cross-connect blocks, on the other hand, are disposed at and are readily available through doors on both sides of the cabinet. This structure further increases the density within a cabinet, reduces the area requirements for the cabinet, and improves access.

SUMMARY OF THE INVENTION

The present invention is directed toward a cross connect cabinet for connecting central office cable pairs to the cross-connect blocks and for connecting other cross-connect blocks to wire pairs of the subscriber cables. The cross connect cabinet comprises a housing having a large rectangular enclosure, a pair of spaced legs extending upward along either side of the enclosure, which legs support the enclosure clear of the support surface for the housing, and an upper connection chamber extending across the upper portion of and providing the top for the enclosure. Cover means are provided for the connection chamber and covers are provided at the ends of the cabinet or sides of the legs to seal the legs. Further, pairs of doors are disposed on opposite sides of the enclosure affording access to the cross-connect blocks mounted therein on fixed frames.

Seals may provided in the connection chamber where the wires and cables enter and leave the area such that this chamber can be filled with a suitable sealant material to encapsulate the connections and the wires subsequent to the connections being made between appropriate wire pairs of the cables and the cross-connect blocks disposed in columns on opposite sides of the cabinet.

BRIEF DESCRIPTION OF THE DRAWING

The present invention will be further described with reference to the accompanying drawing wherein.

DETAILED DESCRIPTION OF THE ILLUSTRATED EMBODIMENT

Figure 1:
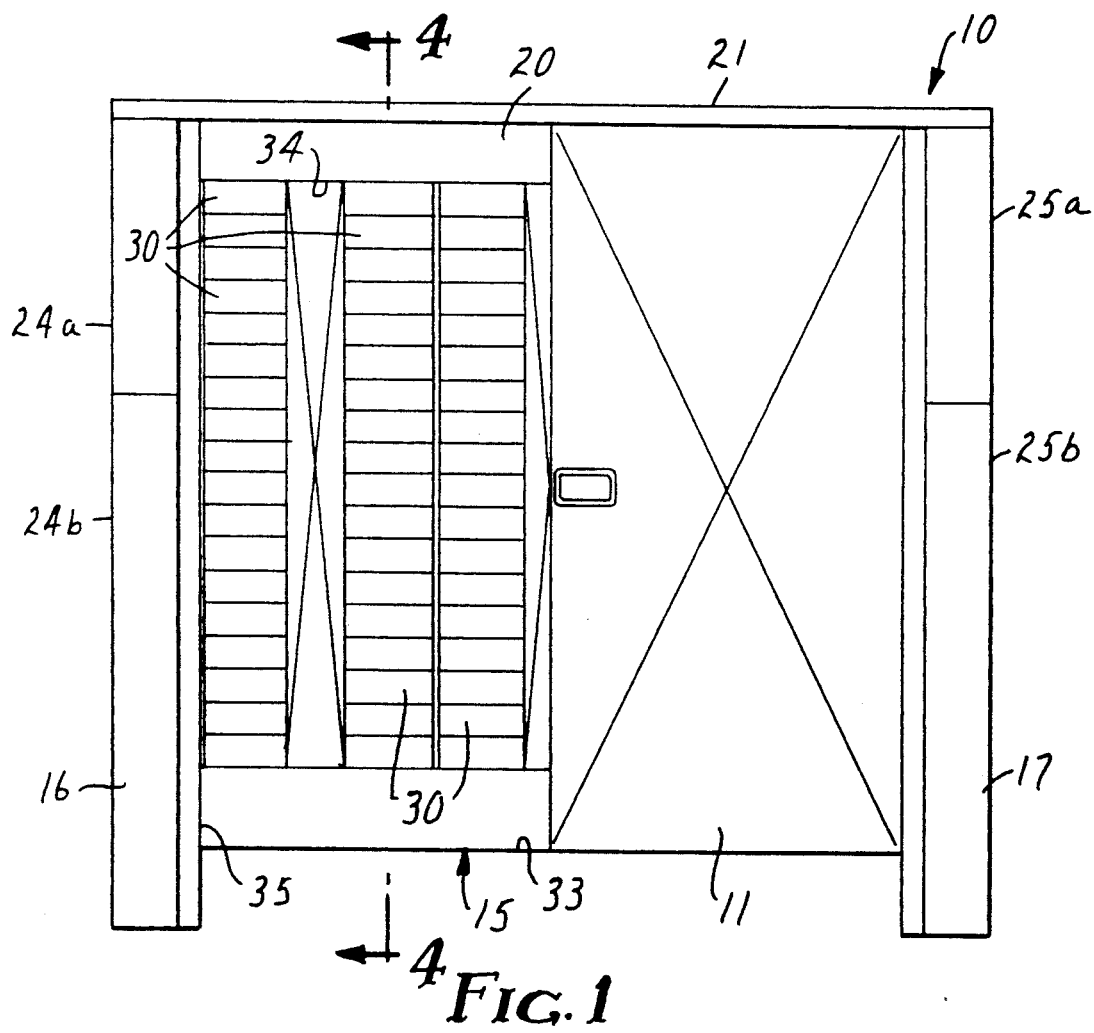
FIG. 1 is a front elevational view of the cross connect cabinet of the present invention, the rear view being substantially identical.
Figure 3:
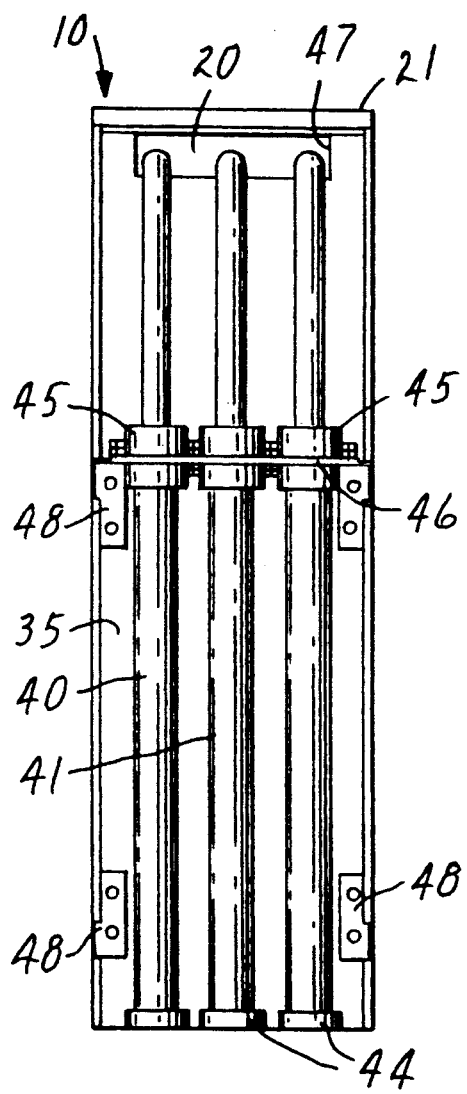
FIG. 3 is an end view of the cabinet with the panel removed to illustrate the construction in a leg portion.

Referring now to FIG. 1, there is illustrated a cross connect cabinet 10, having a pair of doors 11, one door being removed for purposes of illustration to permit a view of the columns of cross-connect blocks 30 supported behind the doors. The second door 11, for the front of the cabinet 10 is illustrated in the closed position. The rear of the cabinet 10 is a mirror image of the front.

The cabinet 10 comprises a housing, formed of metal and including a large rectangular enclosure, generally designated 15, a pair of spaced legs 16 and 17 extending upward along either end of the enclosure and supporting the enclosure clear of the support surface for the housing, and an upper connection chamber, generally designated 20, extending between the upper portions of said legs and providing the top for the enclosure. Cover means 21, in the form of a metal panel with depending side walls, is provided for the connection chamber 20 and covers 24a, 24b and 25a, 25b are provided at the ends of the cabinet 10 or sides of the legs to enclose and afford access to the inside of the legs 16 and 17, respectively. Further, the pairs of doors 11, disposed on opposite sides of the enclosure, afford access to the cross-connect blocks 30. The doors 11 of the cabinet 10 close over the central enclosure 15 having a bottom 33, a top 34 and opposite ends 35, wherein the length and height substantially exceeds the width.

Figure 4:
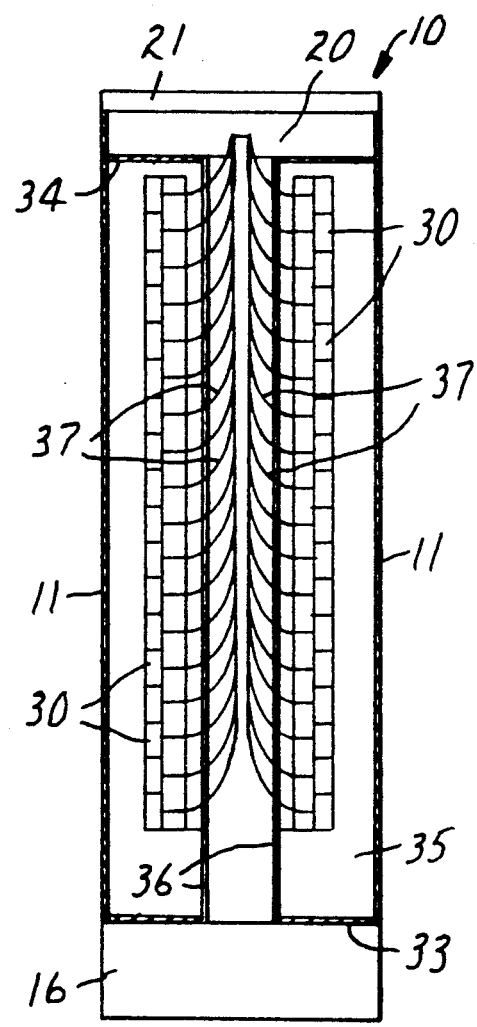
FIG. 4 is a vertical sectional view taken along the lines 4—4 of FIG. 1 to illustrate the position of the cross-connect blocks with respect to each other and the side doors of the cabinet and the relative position of the connection chamber.

Inside of the enclosure and adjacent opposite sides as shown in FIG. 4 are disposed frames 36 supporting conventional cross-connect blocks 30, such as described in U.S. Pat. Nos. 4,210,378 and 4,431,247. The top panel 34 of the enclosure forms the bottom wall of the connection chamber 20 of the housing and is a panel through which the wires 37, illustrated schematically, connected to each of the terminals on the cross-connect block 30 are positioned. These wires all terminate at a portion of a modular connector 38. The mudular 38 is adapted to be connected to a plurality of wire pairs and generally is formed to receive 25 pairs of wires from the terminals on the cross-connect block 30 and half of the module 38 is connected to an equal number of wire pairs in a cable 40, such as from a central office, or to the wire pairs of a subscriber cable 41.

Figure 2:
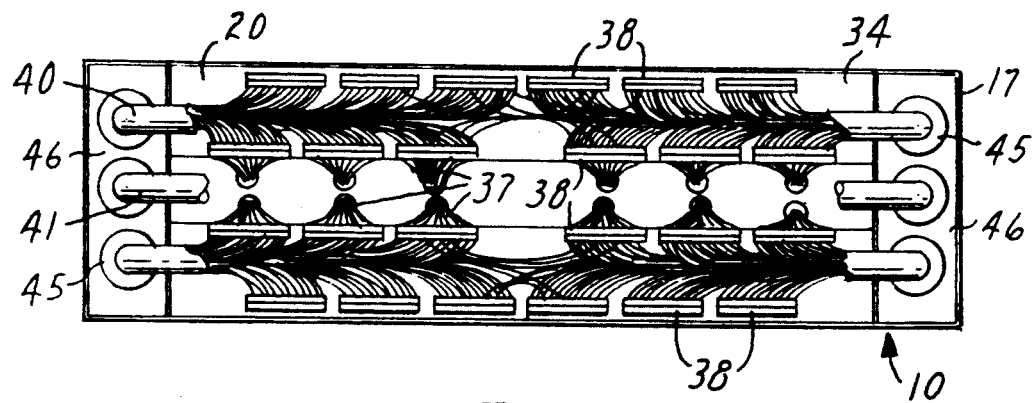
FIG. 2 is a top plan view of the connection chamber with the cover removed to illustrate the connection chamber.

As illustrated in FIG. 2, the pluggable halves of the connectors 38 are joined to each other and placed neatly in rows on the panel 34 within the connection chamber 20 positioned above the enclosure 15. The cables 40 from the central office and the subscriber cables 41 come to the cross connect cabinet 10 from underground and enter the cabinet 10 from the bottom of the legs 16 and 17 disposed at either end of the housing. These cables 40 and 41 enter the cabinet through plastic cable ducts 44 and are supported in the legs by sealing collars 45 fixed in a support bracket 46. The cables 40 and 41 extend upwardly of the leg from the support bracket 46 where they are bent to enter the connection chamber 20 through an opening 47 in the end wall of the connection chamber 20 and in the side wall of the leg. Each of the legs is provided with the external covers, such as covers 24a and 24b, which are slidably supported on brackets 48 and are latched in the closed position normally by suitable locks or fasteners for protecting the communication cables from tampering and access by craftspersons who have no need to have access to the cables when their responsibility is to make the suitable connections between the cross-connect blocks 30 connected respectively to the central station line and the subscriber lines. The doors 11 on the front and rear of the cabinet 10 have special locks affording access by those craftspersons who are assigned the responsibility of making the connections. The cross-connect blocks 30 are suitably spaced such that wires may be maintained in an orderly fashion between columns of blocks 30 and no access is permitted to the wires joining the terminals on the cross connect blocks 30 to the connectors 38 which are connected to the central office cable pairs.

The present invention provides the connection chamber 20 at a position in the top of the housing and above the enclosure for the columns of cross-connect blocks 30 such that access to the modules connecting the wires from the cross-connect blocks 30 to the cables is easily afforded at any time, during set up and after the craftspersons have made numerous connections between cross-connect blocks, which numerous connections and the accompanying wires make movement of such blocks and the frames supporting them virtually impossible.

Figure 5:
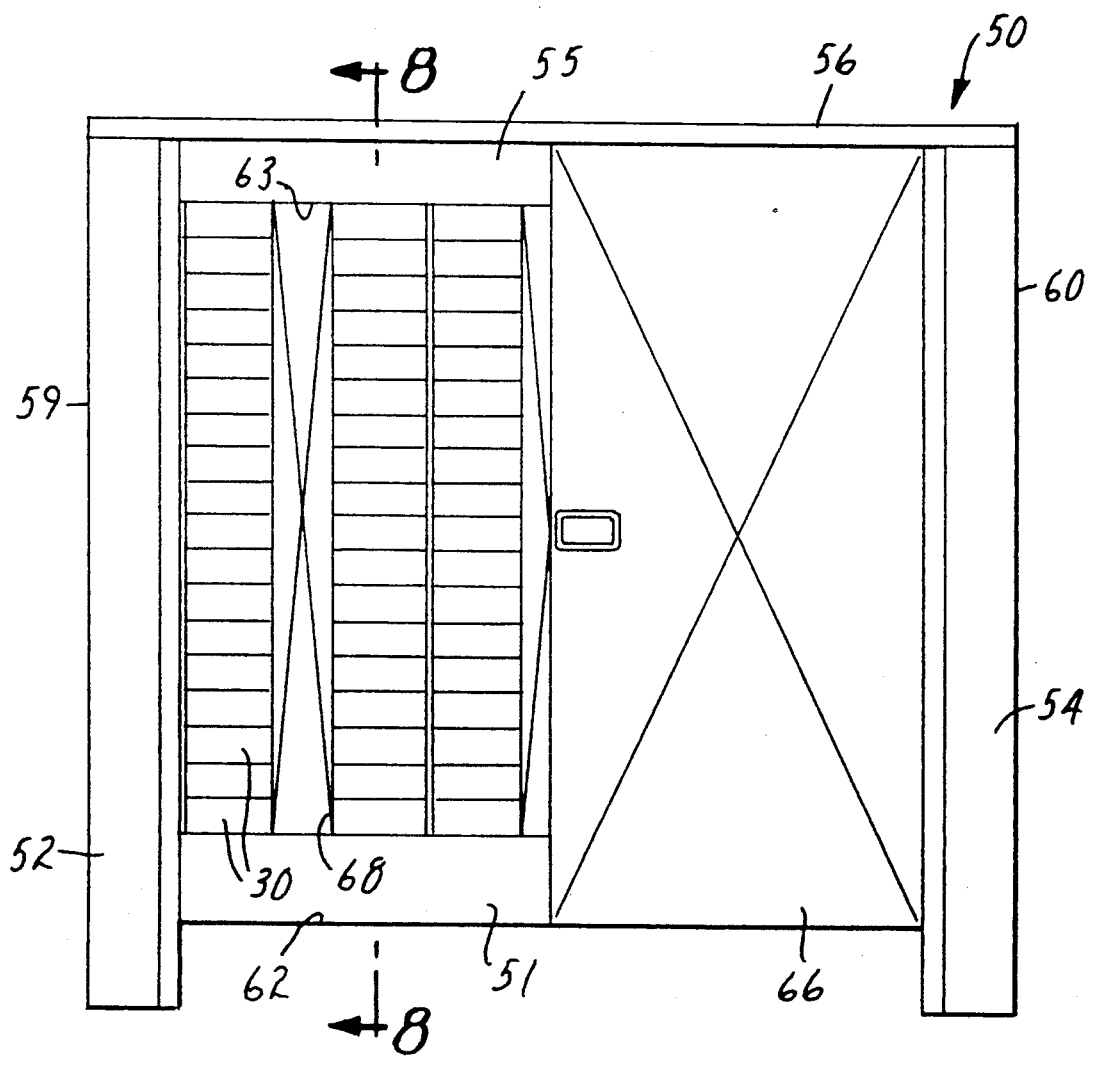
FIG. 5 is a front elevational view of a further embodiment of a cross connect cabinet of the present invention, the rear view being substantially identical.
Figure 7:
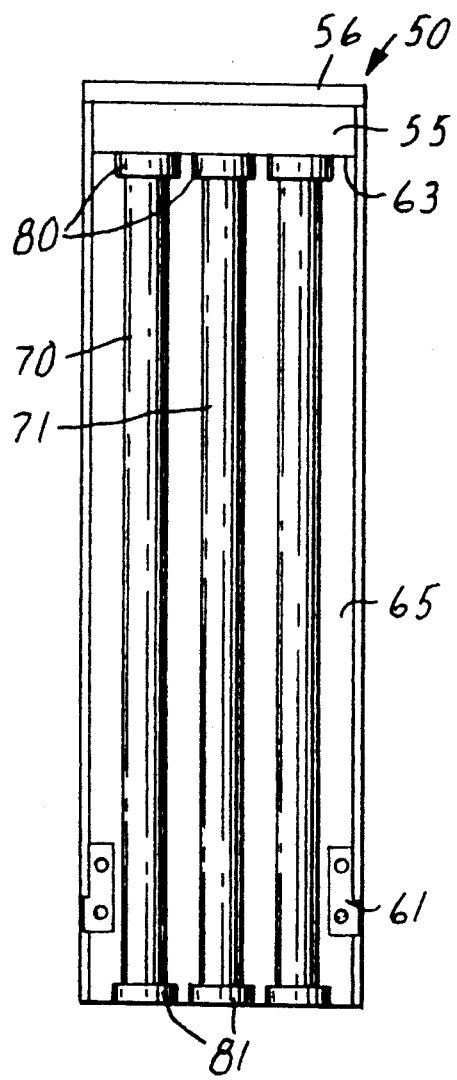
FIG. 7 is an end view of the cabinet of FIG. 5 with the panel removed to illustrate the construction in a leg portion.
Figure 8:
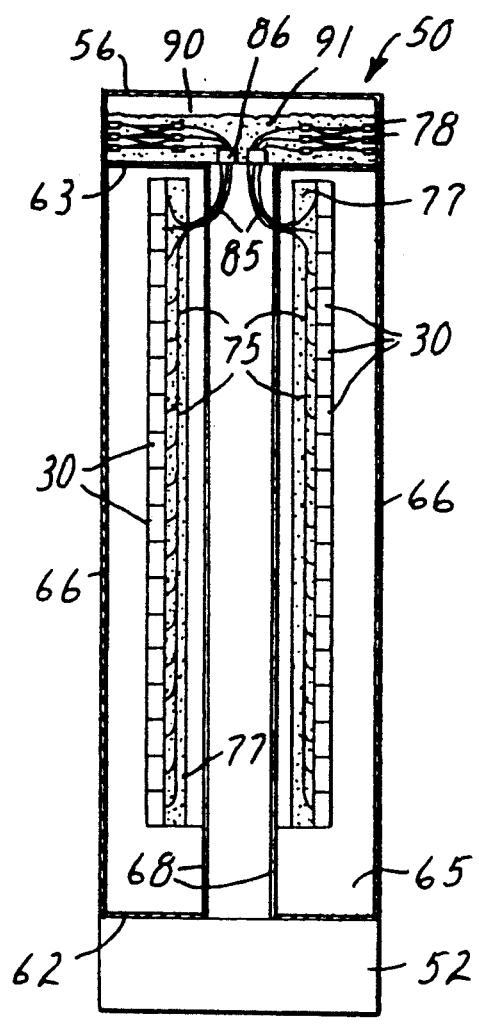
FIG. 8 is a vertical sectional view taken along the lines 8—8 of FIG. 5 to illustrate the position of the cross-connect blocks and the sealing material with respect to the other elements in the cabinet and the relative position of the connection chamber.

In another embodiment, illustrated in FIGS. 5 through 8, a cabinet 50 comprises a housing, formed of metal and including a large centrally positioned rectangular enclosure, generally designated 51, a pair of spaced legs 52 and 54 extending upward along either end of the enclosure 51 and supporting the enclosure clear of the support surface for the housing, and an upper connection chamber, generally designated 55, extending across the upper portions of the legs 52 and 54 and providing the top for the enclosure 51. Cover means 56, in the form of a metal panel with depending side walls, is provided for the connection chamber 55 and covers 59 and 60 are provided at the ends of the cabinet 50 or sides of the legs 52 and 54 to enclose and afford access to the inside of the legs 52 and 54, respectively. The covers 59 and 60 are mounted on brackets 61, see FIG. 7, and are then latched or locked by suitable fasteners, not shown. The cabinet 50 is provided with a pair of doors 66 on opposite sides of the enclosure 51, although only one is illustrated in FIG. 5 to permit illustration of the cross-connect blocks 30 fixedly mounted within the enclosure 51. The doors 66 of the cabinet 50 close over the central enclosure 51, having a bottom 62, a top 63 and opposite ends 65, wherein the length and height substantially exceeds the width.

Inside of the enclosure 51 and adjacent opposite sides as shown in FIG. 4 are disposed frames 68 supporting conventional cross-connect blocks 30, such as described in U.S. Pat. Nos. 4,210,378 and 4,431,247. The top panel 63 of the enclosure 51 forms the bottom wall of the connection chamber 55 of the housing and is a panel through which the cables 70 from the central office and the subscriber cables 71 enter the connection chamber 55 and through which the wires 75 from the terminals on the cross-connect blocks 30 are lead to a portion of a connector 78. The mudular connector module 78 is adapted to be connected to a plurality of wire pairs and generally are formed to receive 25 pairs of wires from the terminals on the cross-connect block 30 and half of the module 78 is connected to an equal number of wire pairs in a cable 70, such as from a the central office, or to the wire pairs of a subscriber cable 71.

Figure 6:
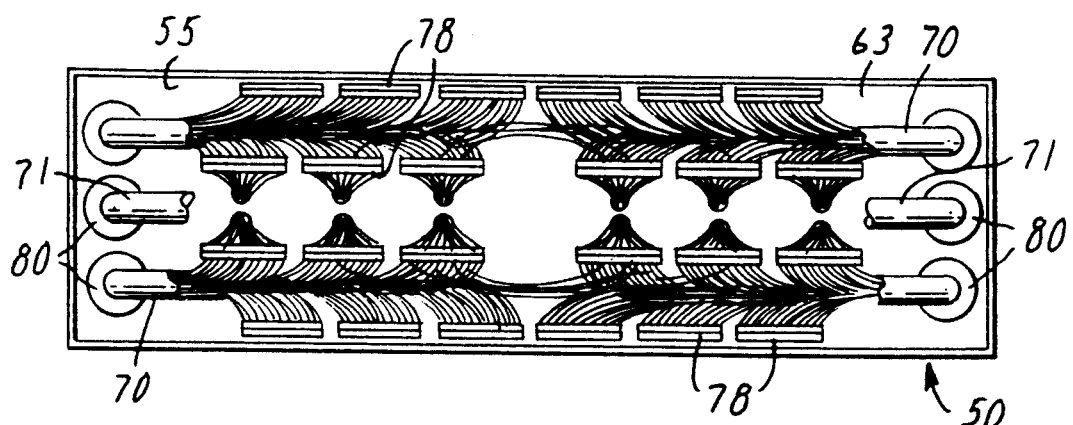
FIG. 6 is a top plan view of the connection chamber of the cabinet of FIG. 5 with a cover removed to illustrate the connection chamber.

As illustrated in FIG. 6, the pluggable halves of the connectors 78 are joined to each other and placed neatly in rows on the panel 63 within the connection chamber 55 positioned above the enclosure 51. The cables 70 and 71 are surrounded by a sealing collar 80 to seal the opening in the panel 63. The cables 70 from the central office and the subscriber cables 71 come to the cross connect cabinet 50 from underground and enter the cabinet 50 from the bottom of the legs 52 and 54 disposed at either end of the housing. These cables 70 and 71 enter the cabinet through plastic cable ducts 81 and extend the length of the cabinet leg to the sealing collars 80 where they enter the connection chamber.

In this embodiment, the wires 75 between the cross-connect blocks 30 and the mudular connectors 78 are encapsulated by a curable resin 77 in the back of each of the fixed vertical frames 68 supporting the cross-connect blocks 30. The blocks 30 are placed on the frames and while disposed horizontally, the frames are filled with the resin 77 which is allowed to cure. Thus, the wires 75, which are of different length, are drawn to one end of the frame 68 and extend from the blocks 30. The wires 75 are gathered and placed in a sleeve 85 which is joined to a suitable grommet 86 at the opening in the panel 63 and enter the connection chamber 55 through the openings above each frame 68 supporting a column of the cross-connect blocks 30 to protect the wires. The wires 75 are then connected by the modules to the cables. After the wire pairs from the cables and the wires from the terminals on the cross-connect blocks are connected, the connection chamber may be filled as indicated at 90, with an encapsulant 91. The encapsulant 91 is allowed to fill the sleeves 85 and the wires 75 are thus totally covered.

The encapsulant 91 may be a reentrable compound which does not cure to a hardened state, or one which only hardens upon exposure to water, or a curable resin which is like the resin 77 and forms a hard body.

The encapsulant protects the connections to the cables and there is rarely need to reenter the connection chamber. However, when necessary it can be done. The cover 56 otherwise protects the connection chamber. The doors 66 on the front and rear of the cabinet 50 have special locks affording access by those craftspersons who are assigned the responsibility of making the cross connections to the blocks 30 between the subscriber cables and the cables from the central station. The wires for cross connections between blocks 30 are maintained in an orderly fashion between columns of blocks 30 and no access is permitted to the wires joining the terminals on the cross connect blocks 30 to the connectors 78 which are connected to the cables 70 and 71.

This embodiment of the present invention provides the connection chamber 55 at a position across the top of the housing and above the enclosure for the columns of cross-connect blocks 30 such that easy access to the modular connectors connecting the wires between the cross-connect blocks 30 and the cables is afforded at any time. The connection chamber is always accessible and it is not necessary to move the blocks 30 or the supporting frames to gain access to the connectors 78.

Having described the present invention with reference to the accompanying drawing, it will be appreciated that changes and modifications can be made to the detailed structure without departing from the spirit or scope of the invention as defined in the appended claims.

What is claimed is:

1. A cross connect cabinet comprising:
a housing and columns of cross-connect blocks having wire receiving terminals,
said housing including
an enclosure for supporting said columns of cross-connect blocks in back to back relationship,
means defining a connection chamber disposed in the upper portion of said housing above said enclosure with the columns of cross-connect blocks for connection of said blocks to incoming cables from a central station and subscribers, and
legs positioned at opposite ends of said housing affording entry of the cables to the opposite ends of the connection chamber.

2. A cabinet according to claim 1 wherein said connection chamber has wall means for defining a chamber with access openings for cables and wires, which connection chamber is separately covered and accessible through a panel different from at least one access panel affording access to the cross-connect blocks.

3. A cross connect cabinet comprising
a housing including
an enclosure for supporting columns of cross-connect blocks, having wire receiving terminals, in back to back relationship,
means defining a connection chamber disposed in the upper portion of said housing above said enclosure for the cross-connect blocks for connection of incoming cables from a central station and subscribers to cross-connect blocks when placed in the enclosure, and
legs positioned at opposite ends of the housing affording entry of the cables to the connection chamber, said connection chamber having wall means for defining a chamber with access openings for cables and wires, and a panel for covering and affording access to said connection chamber, and a separate panel affording access to said enclosure for the cross-connect blocks, said connection chamber comprising means for sealing the openings about the cables and wires such that said chamber may be filled with an encapsulant.

4. A cabinet according to claim 3 comprising cross-connect blocks wherein said cross-connect blocks are mounted in columns on individual frames and disposed in said enclosure, said frames having a layer of encapsulating material covering the wires leading from the cross-connect blocks to one end of the frame.

5. A cross connect cabinet comprising:
a housing and columns of cross-connect blocks having wire receiving terminals,
said housing including:
an enclosure for supporting said columns of cross-connect blocks in back to back relationship, means defining a connection chamber disposed in the upper portion of said housing above said enclosure with the columns of cross-connect blocks for connection of the blocks to incoming cables from a central station and subscribers, and legs positioned at opposite ends of said housing affording entry of the cables to the connection chamber, said cabinet having separate covers for said legs to cover the cables disposed in the legs, a cover for the connection chamber, and doors affording access to the enclosure with said cross-connect blocks.

6. A cabinet according to claim 5 wherein the cross-connect blocks are mounted on frames in columns and the frames are fixed in the housing.

7. A cabinet according to claim 5 wherein said connection chamber has wall means defining a chamber with access openings for cables and wires and is separately covered and accessible through a panel different from the cross-connect blocks.

8. A cross connect cabinet comprising a housing and cross-connect blocks, said cross-connect blocks having wire receiving terminals and wires leading from said terminals from the back of said blocks, said housing including an enclosure for supporting columns of said cross-connect blocks in back to back relationship, means defining a connection chamber disposed in the upper portion of said housing above said enclosure for the cross-connect blocks for connection of incoming cables from a central station and subscribers to said cross-connect blocks in the enclosure, and legs positioned at opposite ends of the housing affording entry of the cables to the connection chamber, wherein said enclosure is rectangular, having a height and width which exceed the depth, and said cross-connect blocks are mounted on frames in fixed position in relationship to each other and to the enclosure, and said housing having doors on opposite sides of the enclosure affording access to the cross-connect blocks, said connection chamber having wall means for defining a chamber with access openings for cables and wires, which chamber is separately covered and accessible through a panel different from the doors for said enclosure, and said connection chamber comprises means for sealing the openings about the cables and wires such that said chamber is sealed for filling of the connection chamber with an encapsulant.

9. A cabinet according to claim 8 wherein said said frames include individual frames for each column of cross-connect blocks, each individual frame having an upper and a lower end, and said individual frames having a layer of encapsulating material covering the wires leading from the cross-connect blocks to one end of the frame.

10. A cabinet according to claim 8 wherein the cross-connect blocks are mounted on frames in columns and the frames are fixed in the housing.

* * * * *

UNITED STATES PATENT AND TRADEMARK OFFICE
CERTIFICATE OF CORRECTION

PATENT NO.      :   5,208,737

DATED           :   5/4/93

INVENTOR(S)     :   Donald F. Miller

It is certified that error appears in the above-identified patent and that said Letters Patent is hereby corrected as shown below:

Column 3, Line 56, "The mudular 38" should read --The modular connector 38--.

Column 5, Line 6, "mudular" should read --modular--.

Column 5, Line 10, "the module 78" should read --the connector 78--.

Column 5, Line 27, "the mudular connectors" should read --the modular connectors--.

Signed and Sealed this

Third Day of January, 1995

*Attest:*

BRUCE LEHMAN

*Attesting Officer*   Commissioner of Patents and Trademarks